(12) United States Patent
Chen et al.

(10) Patent No.: US 6,301,358 B1
(45) Date of Patent: Oct. 9, 2001

(54) DUAL-SLOPE CURRENT BATTERY-FEED CIRCUIT

(75) Inventors: Robert K. Chen, North Andover, MA (US); Dieter J. H. Knollman, Arvada, CO (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/087,216

(22) Filed: May 29, 1998

(51) Int. Cl.[7] .................................................. H04M 11/00
(52) U.S. Cl. ............................................ 379/413; 379/400
(58) Field of Search .................................. 379/413, 400, 379/399

(56) References Cited

U.S. PATENT DOCUMENTS

| | | | |
|---|---|---|---|
| 4,419,542 | 12/1983 | Embree et al. | 179/77 |
| 4,476,350 | 10/1984 | Aull et al. | 179/70 |
| 4,736,415 | 4/1988 | McNeill et al. | 379/413 |
| 5,335,272 | * 8/1994 | Lofmark et al. | 379/413 |
| 5,721,774 | * 2/1998 | Stiefel | 379/413 |
| 5,737,411 | * 4/1998 | Apfel et al. | 379/413 |
| 5,754,644 | * 5/1998 | Akhteruzzaman | 379/413 |
| 5,854,839 | * 12/1998 | Chen et al. | 379/413 |

FOREIGN PATENT DOCUMENTS

| | | | |
|---|---|---|---|
| 0 559 336 A2 | 9/1993 | (EP) | H04M/19/08 |
| 0 806 859 | 11/1997 | (EP) | H04M/19/00 |
| 98 21875 | 5/1998 | (WO) | H04M/19/00 |

OTHER PUBLICATIONS

Pariani, A. et al: "SLIC chip set adapts to different line lengths", Electronic Engineering, vol. 62, No. 766, Oct. 1, 1990, pp. 59–60, 62, XP000165395, ISSN: 0013–4902.

U. S. Patent Application, Akhteruzzaman 5, Serial No. 08/672,190, "Method For Customizing Operation Of A Line Interface Circuit In A Telecommunications Network", Filed Jun. 27, 1996.

* cited by examiner

Primary Examiner—Stella Woo
(74) Attorney, Agent, or Firm—David Volejnicek

(57) ABSTRACT

A dual-supply line-interface circuit (100) uses a –48V power supply ($V_{BAT1}$) to drive long subscriber loops (120) and uses a –28V power supply ($V_{BAT2}$) to drive short subscriber loops. For intermediate-length loops, a dual-slope current-feed profile (FIG. 4) is employed to limit the line-circuit's power dissipation. The line-interface circuit operates in an apparent constant-current mode, generating about 40 mA of differential line current using the low power supply, up to a threshold line voltage of about 25V, which is equal to the low power supply voltage minus required overhead. For longer loops, the line-interface circuit switches to a second constant-current mode, generating about 22 mA of differential current using the high power supply, which maintains the loop current constant until it drops to the 48V resistive-feed value.

14 Claims, 3 Drawing Sheets

DUAL-SLOPE CURRENT BATTERY-FEED CIRCUIT

TECHNICAL FIELD

This invention relates generally to analog telephone line interface circuits, and specifically to the battery feed circuits of such line interface circuit.

BACKGROUND OF THE INVENTION

Conventional analog telephone line-interface circuits, also known as analog port circuits, require a 48VDC power supply for operation and for reliable signaling on long subscriber loops (telephone lines). Long loops have a high resistance relative to short loops, and therefore require a relatively high voltage to drive them. The circuit which couples the DC power to the telephone line is known as a battery-feed circuit. Even though battery-feed circuits commonly employ current-limiting and limit loop current to 42mA, 2W of power can be dissipated by the line-interface circuit. This high power dissipation limits the number of line-interface circuits that can be integrated on a single integrated-circuit device (a "chip"), as well as the number of telephone lines that can be served by a single 48V power supply.

To reduce power dissipation, the art has employed dual-supply line-interface circuits. These circuits employ a second power supply having a voltage lower than the high-voltage (48V) power supply, for powering short subscriber loops.

SUMMARY OF THE INVENTION

In order to reduce even further the power dissipated by a dual-supply line-interface circuit, a dual-slope current-limit profile is employed for operation of the line-interface circuit to effect current limiting. The second power supply preferably operates at 28V, which can be generated from the high-voltage (48V) supply via a DC-to-DC converter. This significantly increases the supply current that is made available by the line-interface circuit to short subscriber loops, and thus significantly increases the number of short subscriber loops which the power supply can handle. For example, assuming 90% efficiency of the converter, the supply current and the short-loop-handling capacity of the power supply are increased by 50%. The 48V supply is still used directly to drive long loops. For intermediate-length loops, the dual-slope current-feed profile is employed to limit the line-interface circuit's power dissipation. The line-interface circuit operates in an apparent constant-current mode using the low power supply up to a threshold line voltage which is equal to the low power supply voltage minus required overhead. For longer loops, the line-interface circuit switches to a second constant-current mode which is substantially lower than the constant current for the shorter loops, which maintains the loop current constant until the loop current drops to the 48V resistive-feed value (the minimum value required to drive a telephony device connected to the loop).

Generally according to the invention, a line-interface circuit for connecting to an analog telephone line that comprises a pair of leads (e.g., tip and ring leads) has a battery-feed circuit that monitors line voltage across the pair of leads and substantially maintains line current flowing between the leads at one of two substantially constant values. When the line voltage is exceeded by a first threshold voltage (e.g., ~25V), the battery-feed circuit maintains the line current at a first substantially-constant value (e.g., 40 mA). When the line voltage exceeds a second threshold voltage (e.g., ~25.5V), the battery-feed circuit maintains the line current at a second substantially-constant value (e.g., 22 mA). If the two thresholds are not one and the same, the battery-feed circuit preferably varies the line current between the first and the second values as the line voltage varies between the first and the second thresholds. Preferably, the line current monitored by the battery-feed circuit is differential current between the two leads. More specifically according to a preferred embodiment of the invention, the battery-feed circuit comprises a driver for driving (powering) the line which uses a first power supply of dual power supplies to drive the line while the line current is at the first current value, and uses a second power supply of the dual power supplies to drive the line while the line current is at the second value. The dual power supplies operate at voltages of significantly different magnitudes— for example, the first power supply operates at −28VDC and the second power supply operates at −48VDC.

Illustratively, the battery-feed circuit includes a current-feedback loop that includes a constant-current supply that generates a constant current for driving the feedback loop to produce a constant current of one of the first and the second current values on the line. The feedback loop further includes a variable-current supply that generates a variable current that combines with the constant current generated by the constant-current supply to drive the feedback loop. The variable current varies with the line voltage to cause the feedback loop to produce the constant current of the one current value on the line when the line voltage is exceeded by the first threshold value, and to cause the feedback loop to produce a constant current of another of the first and second current values on the line when the line voltage exceeds the second threshold value. The variable current further illustratively causes the feedback loop to produce a line current that varies between the first and the second current values as the line voltage varies between the first and the second threshold values, and vice versa.

In one implementation, a line-interface circuit for connecting to an analog phone line comprising a pair of leads has a battery-feed circuit that powers the line from one of a pair of power supplies operating at significantly different voltages. The battery-feed circuit comprises a pair of drivers, each driving a different one of the pair of leads and each sensing voltage on the different one of the pair of leads. One driver uses a first one of the pair of power supplies to drive the line while the differential current on the leads of the line is at a first value, and uses a second one of the pair of power supplies to drive the line while the differential current is at a second value. The two power supplies operate at voltages of significantly different magnitude. The battery-feed circuit also includes a differential-current sensor for sensing the differential current flowing between the pair of leads and generating a first voltage representative of the differential current. The first voltage is used to control a second voltage at a junction. The battery-feed circuit further includes a transconductance amplifier that drives the one of the pair of drivers. It has an input connected to the junction. A variable-current source generates a variable current at the junction as a function of line voltage in order to create a variable said second voltage at the junction. The net effect is that the differential-current sensor, the variable-current generator, the transconductance amplifier, and the one driver form a current-feedback loop that maintains the differential current at a substantially constant first value when the line voltage is below the first threshold value, and maintains the differential current at a substantially constant second value significantly smaller than the first value when the line voltage is above the second threshold value, greater than the first threshold value.

These and other advantages and features of the invention will become more apparent from the following description of an illustrative embodiment of the invention considered together with the drawing.

DETAILED DESCRIPTION

Figure 1:
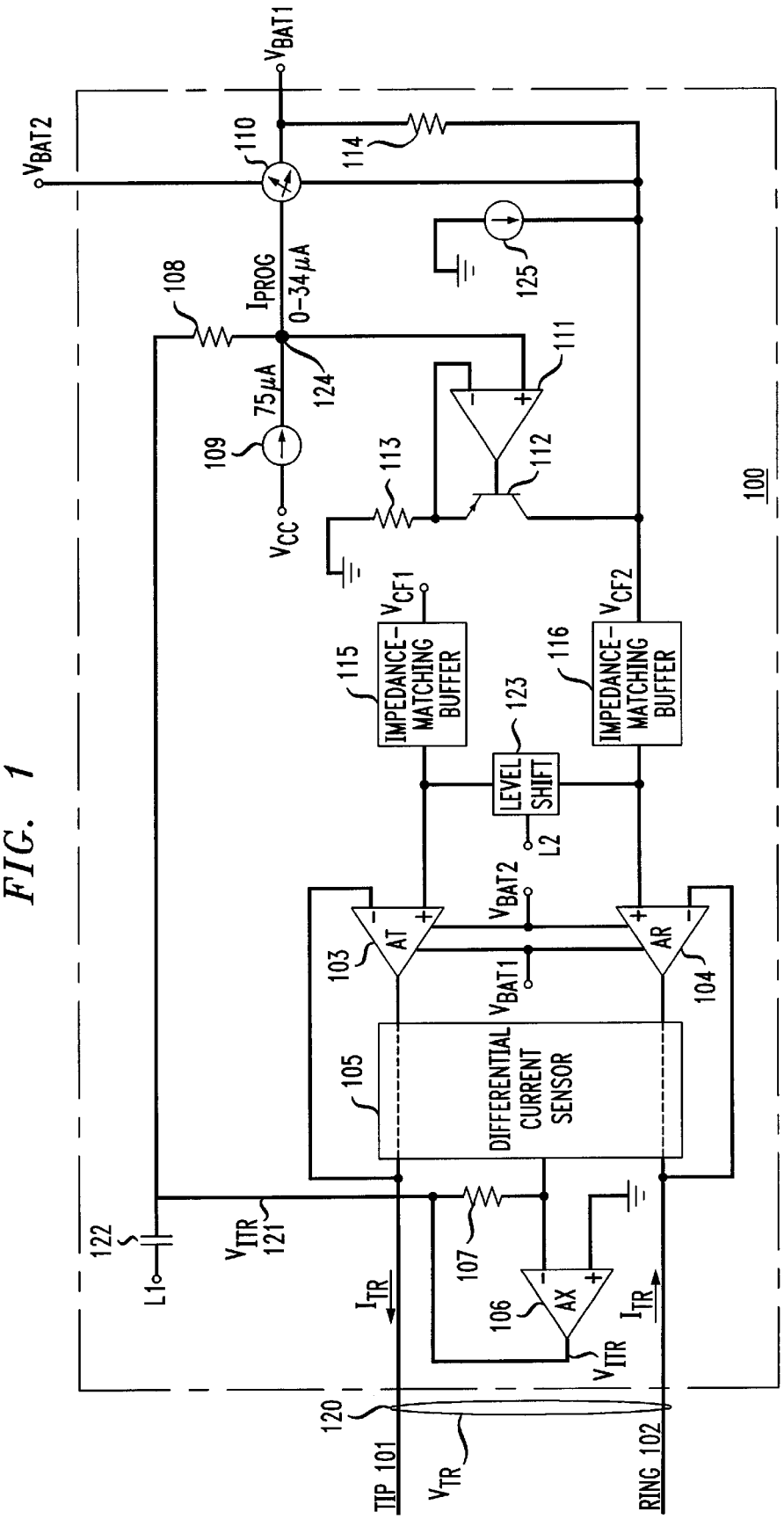
FIG. 1 is a partial circuit-and-block diagram of a telephone line-interface circuit that embodies an illustrative example of the invention.

FIG. 1 shows those portions of a telephone line-interface circuit 100 that are relevant to an understanding of this invention. Circuit 100 is illustratively an L7500-series or an L8500-series subscriberline-interface circuit (SLIC) integrated-circuit device of Lucent Technologies Inc. The SLIC utilizes a voltage-feed current-sense architecture, wherein a pair of voltage sources feed the DC power as well as the voice-band signal to a telephone line 120, and the signal from the far end (e.g., a telephone) is sensed by a differential-current-sense circuit that is connected in series with line 120. The impedances which the SLIC presents to line 120 can be synthesized by the gain around the feedback loop.

Circuit 100 includes a pair of amplifiers AT 103 and AR 104 that are connected through a differential-current sensor 105 to the tip lead 101 and the ring lead 102, respectively, of telephone line 120 and deliver current thereto. The delivered current enables the telephone switching system to detect the presence and status of equipment (e.g., a telephone) connected to telephone line 120. Circuit 100 also couples audio signals from line 9 to telephone line 120 and from telephone line 120 to line L1.

Power amplifiers 103 and 104 are voltage-mode operational amplifiers operating in unity-gain configuration to transmit onto line 120 audio signals supplied to their positive inputs by transmit line L2 through a level-shift circuit 123. Tip lead 101 provides negative feedback to amplifier AT 103, while ring lead 102 provides negative feedback to amplifier AR 104. The positive input of amplifier 103 is connected through an impedance-matching buffer 115 to a voltage source $V_{CF1}$, which in this example provides approximately $\sim 2$ VDC. The positive input of amplifier 104 is connected through an impedance-matching buffer 116 to a voltage $V_{CF2}$. $V_{CF2}$ is produced by forcing a current generated by a current supply 125 into a resistor 114 that is connected to the $V_{BAT1}$ (−48 VDC) supply rail. Illustratively, the current output by current supply 125 is 50 µA and resistor 114 is 100 kΩ, so $V_{CF2}$ is −43 VDC (−48V+50 µA*100 kΩ) when the loop current in line 120 is zero. Amplifiers 103 and 104 supply $V_{CF1}$ and $V_{CF2}$ to tip and ring leads 101 and 102, respectively.

Differential current sensor 105 detects the difference in current flowing on leads 101 and 102 and puts out an indication of that difference to a negative input of an amplifier AX 106. A positive input of amplifier 106 is connected to ground. Amplifier 106 amplifies the difference indication by a magnitude determined by a feedback resistor 107 which connects the output $V_{ITR}$ of amplifier 106 back to the negative input of amplifier 106. In this illustrative example, with no loop current flowing in line 120, output $V_{ITR}$ of amplifier 106 is at 0V. With loop current flowing in line 120 in the normal direction (from tip lead 101 to ring lead 102), output $V_{ITR}$ of amplifier 106 is negative. The transimpedance gain from the differential loop current to $V_{ITR}$ is about 250V per one Ampere of differential current. The output $V_{ITR}$ of amplifier 106 drives signal line $V_{ITR}$ 121. Line $V_{ITR}$ 121 is connected to audio receive line L1 through a DC-blocking capacitor 122. Line $V_{ITR}$ 121 is also connected through a current-limiting resistor 108 to a junction 124 with the output of a current supply 109. Current supply 109 is connected to the supply rail $V_{CC}$, which in this example is +5 VDC, and outputs a constant current of 75 µA to junction 124 in this example.

Junction 124 is connected to a transconductance stage 111–113 which includes an operational amplifier 111, a PNP transistor 112, and a resistor 113. Junction 124 is connected to a positive input of operational amplifier 111. The output of operational amplifier 111 is connected to the base of transistor 112. The emitter of transistor 112 is connected to the negative input of operational amplifier 111, and through resistor 113 to ground. The collector of transistor 112 is connected to $V_{CF2}$. If the voltage at junction 124 is positive, then the current output from the collector of transistor 112 is zero. However, if the voltage at junction 124 is negative, then the current output from the collector of transistor 112 is equal to the voltage at junction 124 divided by resistor 113. The current from the collector of transistor 112 is fed into resistor 114 and therethrough to $V_{BAT1}$. The voltage gain from junction 124 to $V_{CF2}$ is inverting (a gain of −50 in this example) for junction 124 having negative voltages. For junction 124 having a voltage of zero or a positive voltage, the gain is zero. The transimpedance gain from the loop current of line 120 to $V_{ITR}$ 121 is 250 V/A, as stated earlier. Then the input impedance which circuit 100 presents to line 120 is 12.5 kΩ (250 V/A*50). This is the impedance value when circuit 100 is in loop-current-limiting mode.

The voltage at junction 124 is determined by the voltage on line $V_{ITR}$ 121, resistor 108, and current supply 109. As stated earlier, line $V_{ITR}$ 121 is at 0V when the loop current is at zero; hence, the voltage at junction 124 is positive. As the loop current flows, as stated earlier, voltage on line $V_{ITR}$ 121 becomes negative. The loop current for which junction 124 becomes 0 VDC is the current limit for the SLIC.

As described so far, line circuit 100 is conventional. According to the invention, however, by varying the current supplied to junction 124, the current limit of circuit 100 can be changed. Junction 124 is also connected to the input of a second current supply 110. Current supply 110 is driven by a voltage $V_{BAT1}$, which in this example is −48 VDC, and sinks a variable current $I_{PROG}$ from junction 124, which in this example varies from 0 to 34 µA. Hence, the net current at junction 124 is a variable current of 41 to 75 µA. The amount of current sinked by current supply 110 is a function of the difference between a voltage $V_{BAT2}$, which in this example is −28 VDC, and $V_{CF2}$. Both of these voltages are connected to current supply 110.

Figure 2:
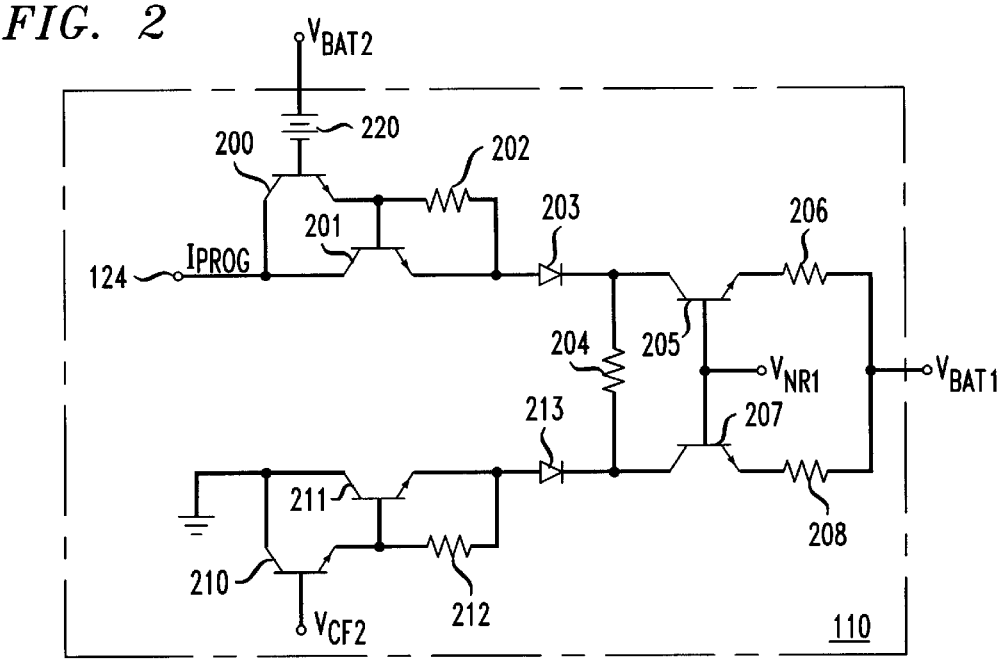
FIG. 2 is a partial circuit diagram of a variable-current supply of the telephone line-interface circuit of FIG. 1.

FIG. 2 shows the structure of relevant parts of variable current supply 110. An NPN transistor 200 has its collector connected to junction 124, its base connected through a voltage supply 220 to $V_{BAT2}$, and its emitter connected to the base of a second NPN transistor 201. Voltage supply 220 keeps the base of transistor 200 at about 2.8 VDC above $V_{BAT2}$. The collector of transistor 201 is connected to junction 124, and its emitter is connected to an input of a diode 203. A resistor 202 connects the base of transistor 201 to its emitter. Together, transistors 200 and 201 and resistor 202 form a Darlington pair.

In a symmetrical configuration, an NPN transistor 210 has its collector connected to ground, its base connected to $V_{CF2}$, and its emitter connected to the base of a second NPN transistor 211. The collector of transistor 211 is connected to ground, and its emitter is connected to an input of a diode 213. A resistor 212 connects the base of transistor 211 to its emitter. Together, transistors 210 and 211 and resistor 212 also form a Darlington pair.

The outputs of diodes 203 and 213 are respectively connected to the collectors of NPN transistors 205 and 207, and are interconnected by a resistor 204. The bases of transistors 205 and 207 are connected to a biasing voltage source $V_{NR1}$, which is adjusted to cause each transistor 205 and 207 to draw 17 µA of current. The emitters of transistors 205 and 207 are respectively connected across resistors 206 and 208 to $V_{BAT1}$.

The operation of variable current supply 110 is as follows. When $V_{CF2}-V_{BAT2}$ is less than 2.8V—the voltage at the base of transistor 200—transistors 210 and 211 are turned off and transistors 200 and 201 are turned on and conducting the 34 µA that are being drawn by transistors 205 and 207 away from junction 124, thereby resulting in 41 µA of current across resistor 108. When $V_{CF2}-V_{BAT2}$ is more than the 2.8V at the base of transistor 200, transistors 200 and 201 are turned off and not conducting current from junction 124 while transistors 210 and 211 are turned on and conducting from ground (and not from junction 124) the 34 µA that are being drawn by transistors 205 and 207. This results in the full 75 µA of current output by current source 109 across resistor 108. When $V_{CF2}-V_{BAT2}$ is substantially at 2.8V, transistors 200 and 201 and 210 and 211 are partially on, resulting in a narrow transition region where between 0 and 34 µA are being conducted by current source 110 away from junction 124.

Figure 3:
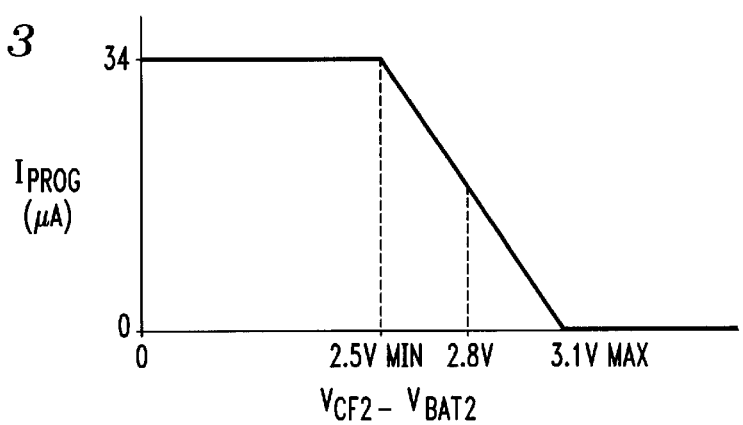
FIG. 3 is a diagram of the operational characteristic of the variable-current supply of FIG. 2.

The operational characteristic of current supply 110 is shown in FIG. 3. While the voltage difference $V_{CF2}-V_{BAT2}$ is below a first threshold of about 2.5V, supply 110 sinks 34 µA of current. Above this threshold in the vicinity of 2.8V, supply 110 sinks current in proportion to the voltage difference, up to a second threshold of about 3.1 V, at which point supply 110 sinks no current. Beyond the second threshold, supply 110 continues to sink no current.

Figure 4:
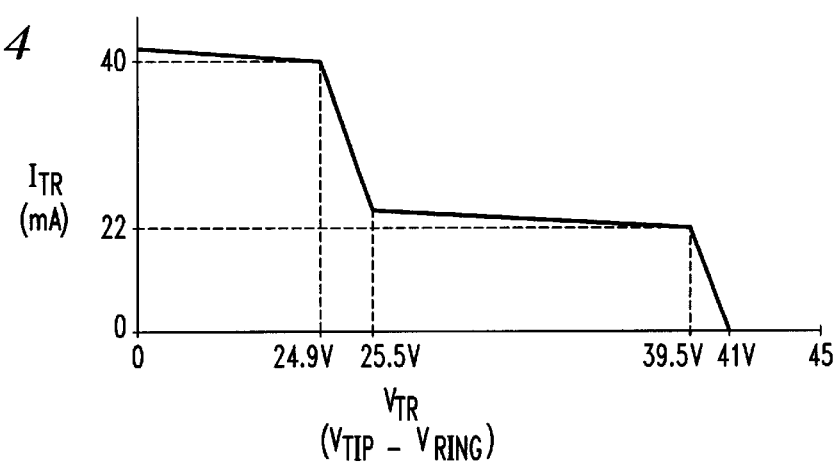
FIG. 4 is a diagram of the operational characteristic of the telephone line-interface circuit of FIG. 1.

The resulting current-limiting operation of line circuit 100 of FIG. 1 is as shown in FIG. 4 and described below. While line 120 is not in use, the voltage $V_{TR}$ between tip lead 101 and ring lead 102 (where $V_{TR}=V_{CF2}=V_{CF1}$) is about 41V, the current $I_{TR}$ from tip lead 101 to ring lead 102 is zero, the differential current on leads 101 and 102 of telephone line 120 is also zero, so the voltage on $V_{ITR}$ line 121 is 0, and the current produced by current supplies 109 and 110 at junction 124 is 41 µA (i.e., 75 µA−34 µA), which produces a 5V drop across resistor 108, i.e., a 5V level at junction 124, thereby turning off high-gain stage cascade 111–113. With cascade 111–113 turned off, current supply 125 and resistor 114 keep $V_{CF2}$ at about −43V. This produces a difference of about −15V between $V_{CF2}$ and $V_{BAT2}$, which (see FIG. 3) causes current generator 110 to sink 34 µA of current from junction 124.

When line 120 comes into use (e.g., a telephone goes "off hook" on line 120) $V_{TR}$ begins to drop, and when it drops to about 41V, loop current begins to flow in line 120. The loop current in line 120 increases to about 22 mA as $V_{TR}$ drops to about 39.5V. At this point, line $V_{ITR}$ 121 is sufficiently negative so that junction 124 is at 0VDC (41 µA*133 kΩ/250), high-gain cascade 111–113 turns on and limits the loop current in line 120 to about 22 mA as $V_{TR}$ drops further. When VTR drops to about 25.5V, $I_{PROG}$ current output by circuit 110 starts to decrease from 34 µA to zero. The net current flow output of junction 124 to resistor 108 is increased from 41 µA to 75 µA as $V_{TR}$ drops further to 24.9V. Any further decrease in $V_{TR}$ does not result in increased current output from junction 124 into resistor 108; therefore, the loop current in line 120 stays at a relatively constant value of about 40 mA.

Figure 5:
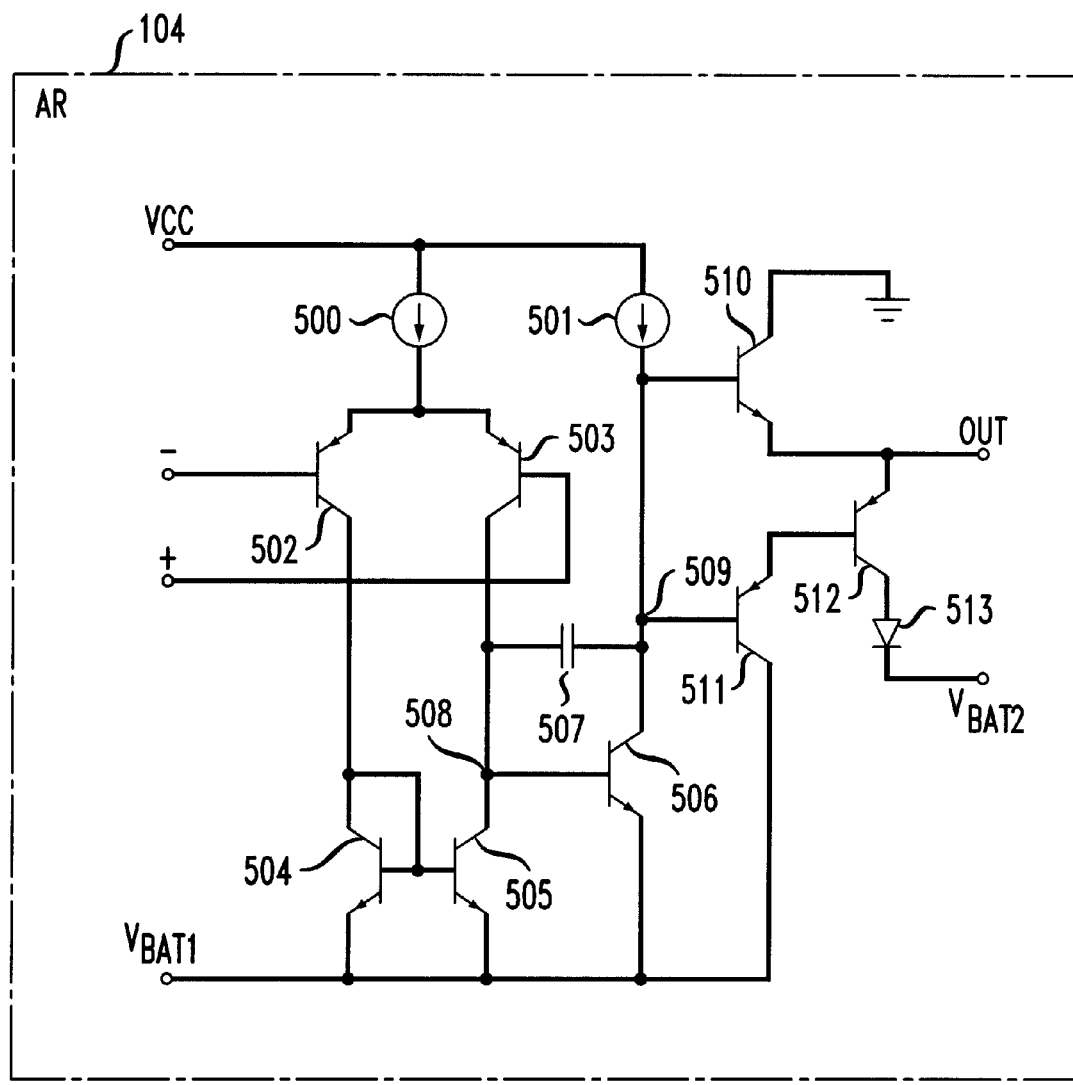
FIG. 5 is a circuit diagram of an amplifier of the telephone line-interface circuit of FIG. 1.

In order to take full advantage of this DC feed profile for power-feeding efficiency, amplifier AR 104 must be modified from its traditional three-stage configuration. FIG. 5 shows such a simplified voltage-mode operational amplifier. Essentially, the modification involves adding a fourth stage comprising a current-steering transistor and a diode to the amplifier output. The first stage, comprising a current source 500 and transistors 502–505, is a transconductance amplifier, which outputs a current at junction 508 into the base of a transistor 506. The second stage, comprising a current source 501 and the transistor 506, is a common-emitter amplifier, which takes the output current from the first stage and beta-multiplies it to its collector output, junction 509. A Miller capacitor 507 connected between junctions 508 and 509 compensates the operational amplifier to ensure stable unity gain. The third stage is a push-pull amplifier, comprising transistors 510 and 511, which provides the drive capability to the output load. In order to take advantage of $V_{BAT2}$ being a lower supply voltage than $V_{BAT1}$, a current-steering transistor 512 is incorporated in the design. It works in the following manner. If $V_{out}-V_{BAT2}$ is greater than 2.5V, transistor 512 is in its active mode, and the load current sink from junction 509 flows to $V_{BAT2}$ through a diode 513.

Only a small fraction of current (1/(1+beta)) of the load current flows into the emitter of transistor 511 and to $V_{BAT1}$. If $V_{OUT}-V_{BAT2}$ is less than 2.5V, transistor 512 is in saturation and cannot support the load current with high beta; the load flows through the base-emitter junction of transistor 512 into the emitter of transistor 511 and to $V_{BAT1}$. The threshold of 2.5V is controlled by the forward-on voltage of diode 513 and the internal collector resistance of transistor 512 times the worst-case loop current. This 2.5V threshold is also incorporated into the design of circuit 110 to ensure that, when the load current is steered from $V_{BAT2}$ to $V_{BAT1}$, the tip and ring current limit has already reached 22 mA, thereby minimizing the SLIC chip internal power dissipation.

Of course, various changes and modifications to the illustrative embodiment described above will be apparent to those skilled in the art. For example, the circuitry can be implemented from active components having an opposite polarity to that shown. Also, the circuitry can be implemented using different circuit technologies or circuit designs. Such changes and modifications can be made without departing from the spirit and the scope of the invention and without diminishing its attendant advantages. It is therefore intended that such changes and modifications be covered by the following claims.

What is claimed is:

1. A line-interface circuit for connecting to an analog telephone line comprising a pair of leads having a battery-feed circuit including circuitry that monitors line voltage across the pair of leads and further including circuitry that maintains line current flowing between the leads at a substantially constant first current value when the line voltage is exceeded by a first threshold value and maintains the current at a substantially constant second current value that is significantly smaller than the first current value when the line voltage exceeds a second threshold value, including circuitry that monitors differential said current flowing between the leads to keep said current substantially constant at the first and the second current values.

2. The line-interface circuit of claim 1 wherein the first threshold value and the second threshold value are substantially the same.

3. The line-interface circuit of claim 1 wherein the second threshold value exceeds the first threshold value and the battery circuit varies the current from the first current value to the second current value as the line voltage changes from the first threshold value to the second threshold value, and vice versa.

4. The line-interface circuit of claim 1 whose battery-feed circuit includes a current-feedback loop having a constant-current supply generating a constant current that drives the current-feedback loop to produce a constant current of one of the first and the second current values on the line, and the current-feedback loop further has a variable-current supply generating a variable current that is combined with the constant current generated by the constant-current supply to drive the loop and that varies with the line voltage, the variable current causing the current-feedback loop to produce the constant current of the one current value on the line when the line voltage is exceeded by the first threshold value and causing the current-feedback loop to produce a constant current of another of the first and the second current values on the line when the line voltage exceeds the second threshold value.

5. The line-interface circuit of claim 1 wherein the variable current further causes the current-feedback loop to produce a line current on the line that varies between the first and the second current values as the line voltage varies between the first and the second threshold values, and vice versa.

6. The line-interface circuit of claim 1 wherein the battery-feed circuit comprises a driver for powering the line, the driver using a first of a pair of power supplies to drive the line while the line current is at the first current value and using a second of the pair of power supplies to drive the line while the line current is at the second value, the first power supply operating at a voltage of significantly greater magnitude that a voltage at which the second power supply operates.

7. The line-interface circuit of claim 6 wherein the driver sinks line current from the line to a −28V power supply while the line current is at the first current value and sinks current from the line to a −48V power supply while the line current is at the second current value.

8. The line-interface circuit of claim 7 wherein the first current value is about 40mA, and the second current value is about 22 mA.

9. A line-interface circuit for connecting to an analog telephone line comprising a pair of leads, having a battery-feed circuit that powers the line from one of a pair of power supplies operating at significantly different voltages and that comprises a pair of drivers each driving a different one of the pair of leads and each sensing voltage on the different one of the pair of leads, a differential-current sensor sensing a differential current flowing between the pair of leads and generating a first voltage representative of the differential current, the first voltage controlling a second voltage at a junction, a transconductance amplifier driving one of the pair of drivers and having an input connected to the junction, a variable-current source generating a variable current at the junction as a function of line voltage to create a variable said second voltage at the junction so that the differential-current sensor, the variable-current source, the transconductance amplifier, and the one driver form a current-feedback loop that maintains the differential current at a substantially constant first value when the line voltage is below a first threshold value and maintains the differential current at a substantially constant second value significantly smaller than the first value when the line voltage is above a second threshold value greater than the first threshold, the one driver using a first of the pair of power supplies to drive the line while the differential current is at the first value and using a second of the pair of power supplies to drive the line while the differential current is at the second value, the first power supply operating at a voltage of significantly greater magnitude than a voltage at which the second power supply operates.

10. The line-interface circuit of claim 9 wherein the variable-current source comprises a constant-current first source generating a constant current at the junction to create the second voltage at the junction that causes the feedback loop to maintain the differential current at one of the constant first and second values, and a variable-current second source generating a variable current at the junction as a function of line voltage which, when combined with the constant current generated by the constant current source, creates the second voltage at the junction that causes the feedback loop to maintain the differential current at the first value when the line voltage is below the first threshold and to maintain the differential current at the second value when the line voltage is above the second threshold.

11. The line-interface circuit of claim 10 wherein the second source causes the feedback loop to vary the differential current between the first and the second value when the line voltage varies between the first and the second thresholds.

12. A line-interface circuit for connecting to an analog telephone line comprising a pair of leads, having a battery-feed circuit including circuitry that monitors line voltage across the pair of leads and further including circuitry that maintains line current flowing between the leads at a substantially constant first current value when the line voltage is exceeded by a first threshold value and maintains the current at a substantially constant second current value that is significantly smaller than the first current value when the line voltage exceeds a second threshold value, and the battery feed circuit further including a driver for powering the line, the driver using a first of a pair of power supplies to drive the line while the line current is at the first current value and using a second of the pair of power supplies to drive the line while the line current is at the second value, the first power supply operating at a voltage of significantly greater magnitude that a voltage at which the second power supply operates.

13. The line-interface circuit of claim 12 wherein the driver sinks line current from the line to a −28V power supply while the line current is at the first current value and sinks current from the line to a −48V power supply while the line current is at the second current value.

14. The line-interface circuit of claim 13 wherein the first current value is about 40mA, and the second current value is about 22 mA.

* * * * *